United States Patent
Park et al.

(10) Patent No.: US 7,904,018 B2
(45) Date of Patent: Mar. 8, 2011

(54) DIGITAL MULTIMEDIA BROADCAST RECEIVER AND USER INTERFACE METHOD THEREOF

(75) Inventors: Eun-hee Park, Suwon-si (KR);
Dong-seok Kim, Suwon-si (KR);
Hyun-cheol Park, Suwon-si (KR);
Keun-mi Song, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1421 days.

(21) Appl. No.: 11/255,982

(22) Filed: Oct. 24, 2005

(65) Prior Publication Data

US 2006/0099907 A1    May 11, 2006

(30) Foreign Application Priority Data

Nov. 9, 2004   (KR) .................. 10-2004-0091052

(51) Int. Cl.
*H04H 20/71*   (2008.01)
(52) U.S. Cl. ..... 455/3.01; 455/3.06; 455/509; 455/414.1
(58) Field of Classification Search .................. 455/3.02, 455/3.01, 3.03, 3.06, 414.1, 414.3, 414.4, 455/452.1, 502, 503, 509, 566, 517, 556.2, 455/550.1; 348/563, 731; 725/43, 46, 40; 370/312, 389
See application file for complete search history.

(56) References Cited

U.S. PATENT DOCUMENTS

| | | | | |
|---|---|---|---|---|
| 5,731,844 | A * | 3/1998 | Rauch et al. | 725/40 |
| 6,215,530 | B1 * | 4/2001 | Wasilewski | 348/731 |
| 7,188,356 | B1 * | 3/2007 | Miura et al. | 725/46 |
| 7,289,158 | B2 * | 10/2007 | Ichifuji et al. | 348/563 |
| 2002/0119760 | A1 * | 8/2002 | Oyagi | 455/130 |
| 2005/0060744 | A1 * | 3/2005 | Kim et al. | 725/40 |
| 2005/0259961 | A1 * | 11/2005 | Sano | 386/83 |
| 2006/0262227 | A1 * | 11/2006 | Jeong | 348/723 |
| 2009/0070815 | A1 * | 3/2009 | Barrett et al. | 725/43 |

FOREIGN PATENT DOCUMENTS

| | | |
|---|---|---|
| CN | 1756318 A | 4/2006 |
| JP | 10-150377 A | 6/1998 |
| JP | 2000-216693 A | 8/2000 |
| JP | 2000-216694 A | 8/2000 |
| JP | 2000-295125 A | 10/2000 |
| JP | 2002-344337 A | 11/2002 |
| JP | 2003-339030 A | 11/2003 |

* cited by examiner

*Primary Examiner* — John Lee
(74) *Attorney, Agent, or Firm* — Sughrue Mion, PLLC (57) ABSTRACT

A digital multimedia broadcast (DMB) receiver and a user interface including a processor that processes the received DMB signal and extracts information regarding ensembles and services from the DMB signal so that the user interface can display received services using the extracted information regarding the ensembles and services. The user interface can be a grid-type interface which includes an ensemble axis and a service axis to display multiple services linked to an ensemble along with the total duration of each service and the duration that each service has been viewed so that a user can easily determine the current status of each service.

22 Claims, 10 Drawing Sheets

DIGITAL MULTIMEDIA BROADCAST RECEIVER AND USER INTERFACE METHOD THEREOF

CROSS-REFERENCE TO RELATED APPLICATIONS

This application claims the priority of Korean Patent Application No. 10-2004-0091052, filed on Nov. 9, 2004, in the Korean Intellectual Property Office, the disclosure of which is incorporated herein in its entirety by reference.

BACKGROUND OF THE INVENTION

1. Field of the Invention

The present invention relates to digital multimedia broadcasting (DMB), and more particularly, to a DMB receiver and a user interface method thereof.

2. Description of the Related Art

In DMB, signals such as an image information signal, an audio information signal, and a character information signal, are compressed in an MPEG-2 format, and service information signals corresponding to a plurality of physical channels and a plurality of logical channels of each physical channel, are multiplexed and transmitted. The multiplexed signals are transmitted to a DMB receiver via various broadcasting methods such as satellite broadcasting and terrestrial broadcasting. An ensemble of a predetermined frequency is comprised of a plurality of services, which are broadcast programs, and each of the services is comprised of a plurality of service components. For example, physical channels such as KBS, MBC, EBS, and SBS, correspond to ensembles, and logical channels such as TV 1, TV 2, radio 1, radio 2, and traffic alert broadcasting service, correspond to services.

As described above, a DMB signal contains an ensemble and a plurality of services that are multiplexed according to a code division method. That is, a DMB signal that contains an ensemble and a plurality of services linked to the ensemble is transmitted to a DMB receiver. Since the DMB receiver receives a plurality of broadcasts linked to an ensemble in a time zone, a user interface through which an ensemble and a service are selected is required to select a desired broadcast from the plurality of broadcasts.

Meanwhile, with a conventional broadcast signal, only one broadcast program is transmitted per one physical channel. Accordingly, a desired broadcast program can be viewed by selecting the appropriate channel at the appropriate time. A user interface disclosed in U.S. Pat. No. 5,731,844 that teaches a conventional method of selecting a television (TV) broadcast program will now be described.

Figure 1:
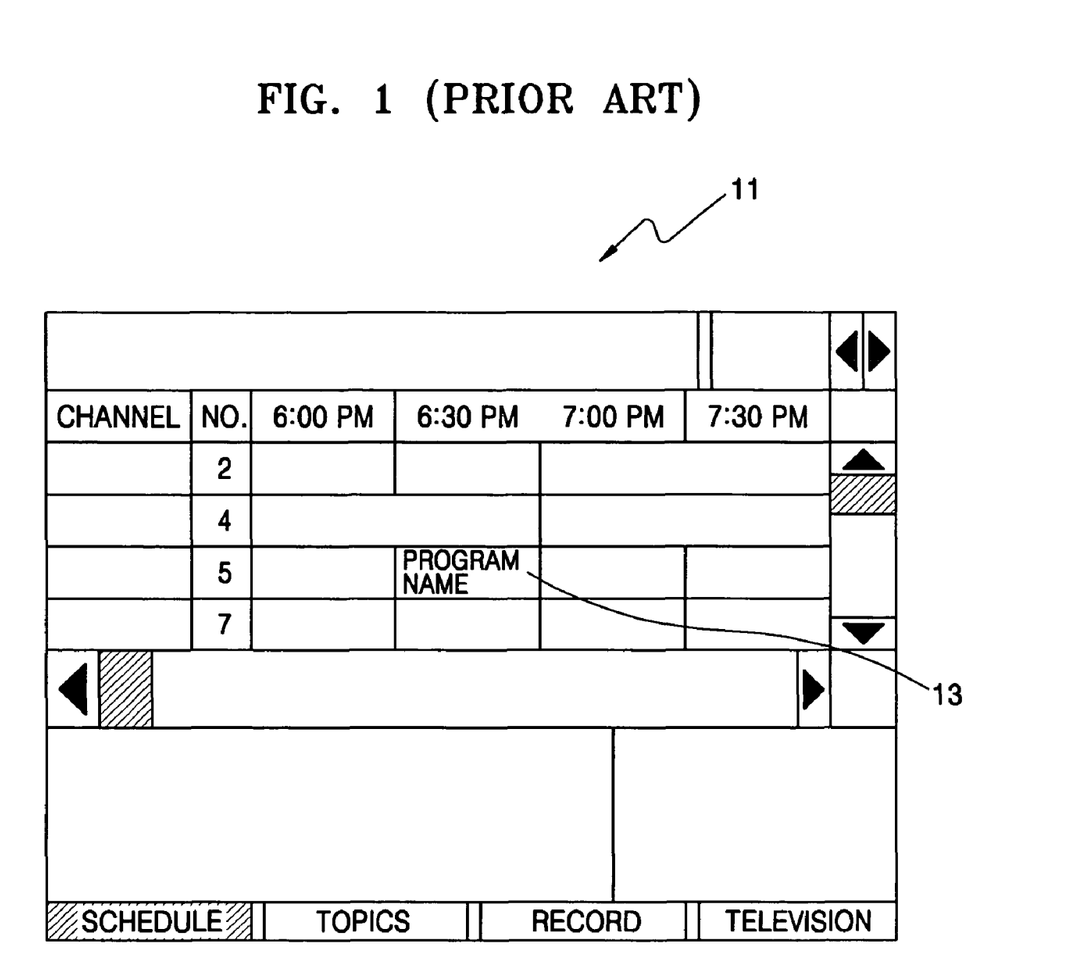
FIG. 1 is a view of a conventional user interface screen in which a desired television (TV) program is selected.

FIG. 1 is a view of a conventional user interface screen 11 in which a desired TV program is selected. In the user interface screen 11, channels are displayed vertically in a column and available broadcast programs 13 are displayed horizontally in rows corresponding to the channels. Here, the broadcast programs 13 are ordered in the horizontal direction according to the times at which they are broadcast.

Figure 2:
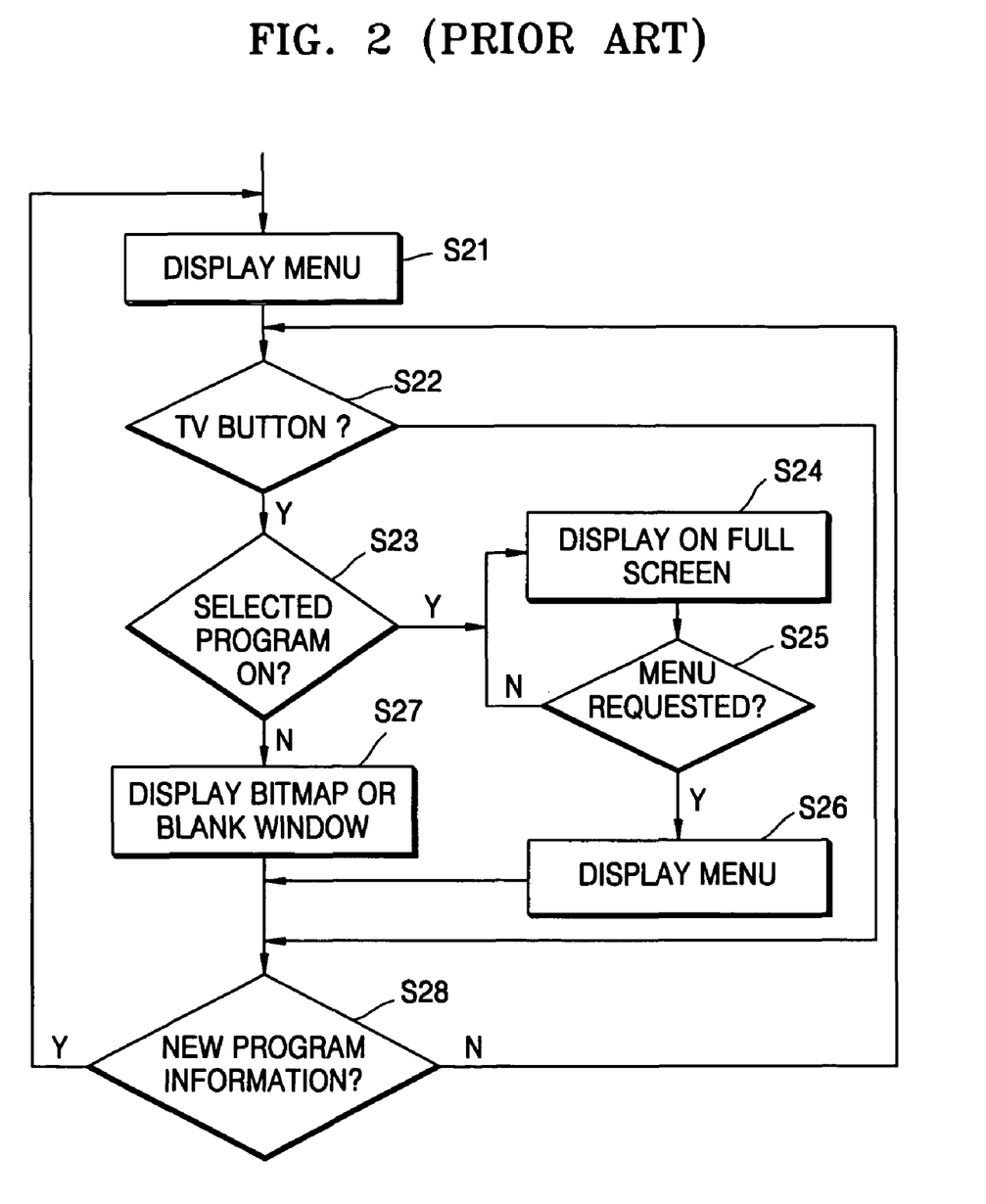
FIG. 2 is a flowchart illustrating conventional method of selecting a desired TV program.

FIG. 2 is a flowchart illustrating a conventional method of selecting a TV program. Referring to FIG. 2, at S22 a user selects a "Television" menu from among menus displayed at the bottom of the user interface screen 11 of FIG. 1 and one of the broadcast programs 13 displayed according to time on the top of the user interface screen 11. If the broadcast program 13 selected by the user is being broadcasted (S23), the broadcast program 13 is displayed in a full screen mode (S24). If not, a predetermined bitmap screen such as a broadcasting company logo or a color adjustment table is displayed (S27).

As described above, conventionally, since only one broadcast is received through a physical channel in a given time zone, it is possible to display broadcast programs on the aforementioned conventional user interface screen 11 in a time sequence.

However, a DMB signal contains a physical channel (ensemble) and a plurality of broadcast services linked to the physical channel, thus allowing the broadcast services to all be received at the same time in the same time zone. Accordingly, it is impossible to display physical channels and a plurality of broadcast services linked to each of the channels that are contained in the DMB broadcast signal on a conventional user interface screen.

SUMMARY OF THE INVENTION

The present invention provides a DMB receiver capable of displaying a plurality of services linked to an ensemble and allowing a user to easily select a desired service, and a user interface method thereof.

Consistent with one exemplary embodiment of the present invention, there is provided a digital multimedia broadcast (DMB) receiver comprising a receiver receiving a DMB signal; a processor processing the received DMB signal and extracting information regarding ensembles and services from the DMB signal; and a user interface displaying received services using the extracted information regarding the ensembles and services, the user interface being a grid-type interface which includes an ensemble axis and a service axis.

The user interface may further comprise an input unit receiving information regarding a desired service from a user.

The input unit may comprise four directional keys and an enter key, and the desired service may be selected by manipulating the four directional keys and the enter key.

The services may be displayed in a grid on the user interface, the user interface may receive the information regarding the desired service from the user via the input unit, and the processor may execute the desired service.

The user interface may further display a total duration of each service and a duration that each service has been viewed.

The user interface may display the total duration of each service and the duration that each service has been viewed using status bars.

The processor may extract the information regarding the ensembles and the services from service information contained in a fast information channel of the DMB signal.

The receiver may receive the DMB signal via a satellite broadcast, a surface broadcast, or a broadcasting method which is a combination of satellite and surface broadcasting.

The DMB receiver may be one of a setup box, a recorder, a reproducer, a digital television receiver, and a mobile device.

Consistent with another aspect of the present invention, there is provided a user interface method for a digital multimedia broadcast (DMB) receiver, the user interface method including extracting information regarding ensembles and services contained in an input DMB signal by processing the input DMB signal; and displaying received services on the user interface using the extracted information. The user interface is a grid-type interface that includes an ensemble axis and a service axis.

BRIEF DESCRIPTION OF THE DRAWINGS

The above and other aspects and advantages of the present invention will become more apparent by describing in detail exemplary embodiments thereof with reference to the attached drawings in which.

DETAILED DESCRIPTION OF THE INVENTION

Figure 3:
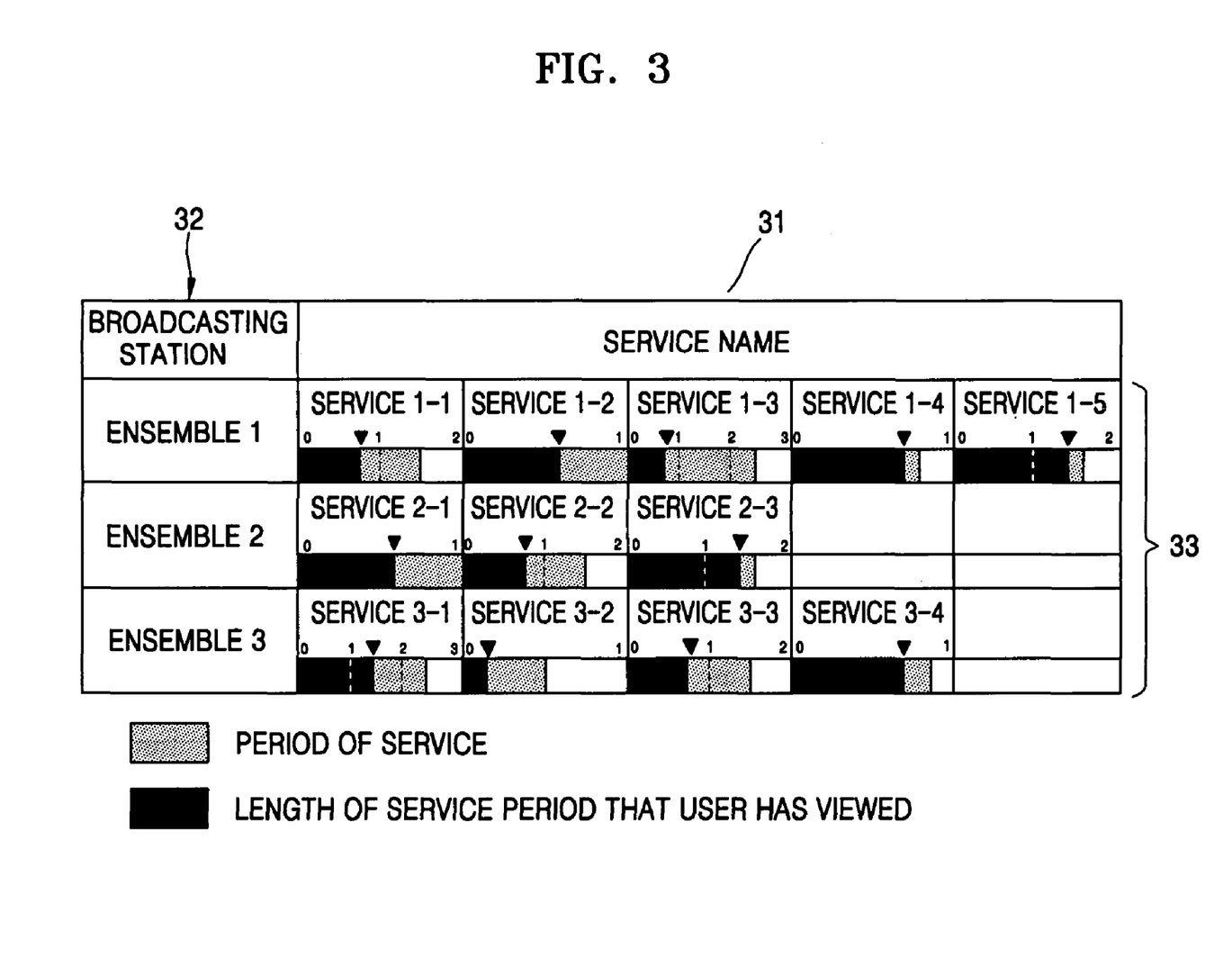
FIG. 3 is a view of a user interface screen consistent with an embodiment of the present invention.

FIG. 3 is a view of a user interface screen 31 consistent with an embodiment of the present invention. Referring to FIG. 3, the user interface screen 31 is a grid-type screen that includes an ensemble axis 32 on which physical channels are displayed, and a service axis 33 on which logical channels are displayed. Referring to FIG. 1, in a conventional user interface 11 through which a television (TV) program is selected, the names of programs 13 are displayed using a channel axis and a time axis. Therefore, the conventional user interface 11 is insufficient to completely represent the characteristics of a DMB that provides a plurality of services linked to each physical channel. In contrast, the user interface 31 of FIG. 3 is suitable for displaying a plurality of services linked to an ensemble and visualizing DMB broadcast contents.

If ensemble 1 is KBS, services 1-1, 1-2, 1-3, 1-4, and 1-5 may represent TV1, TV2, radio 1, radio 2, and a traffic alert broadcast service, respectively. The user interface screen 31 of FIG. 3 displays a plurality of services provided by an ensemble such that the services can easily be viewed at a glance and a user can easily select a desired broadcast service.

The user interface screen 31 of FIG. 3 fairly represents the DMB characteristic of the number of services to be linked to an ensemble being easily changeable as a transmitter desires. When the number of services to be linked to ensemble 1 is changed from five to three, spaces for services 1-4 and 1-5 of the user interface screen become blank.

Further, the user interface screen 31 of FIG. 3 graphically displays the total duration of each of the services and the duration for which each service has been viewed up to present.

Figure 6:
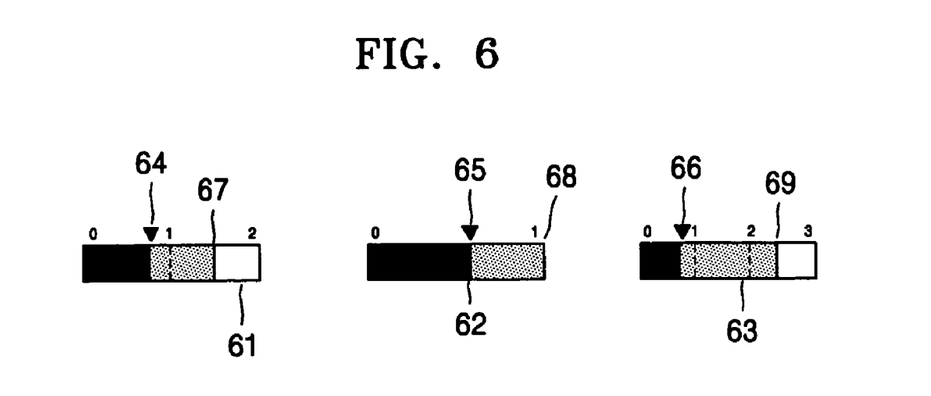
FIG. 6 illustrates examples of a status bar indicating the total duration of a service and the duration it has been viewed up to present, consistent with an embodiment of the present invention.

FIG. 6 illustrates examples of status bars 61, 62, and 63 indicating the total duration of a service 67, 68, 69 and the duration for which that service has been viewed 64, 65, 66 up to present according to an embodiment of the present invention. As illustrated in FIG. 3, all of the services have a status bar so that a user can easily view the status of any service at a glance. The total duration of each service is set according to a transmitter's discretion. For instance, the duration of a service may be one, two, or three hours. Consistent with an embodiment of the present invention, durations of services are converted into relative times and displayed using bars of equal length. Referring to FIG. 6, three services of different duration are illustrated using status bars of equal length 61, 62, and 63. Also, the duration each of the services has been viewed is indicated with a black bar and/or an arrow 64-66. Thus, it is easy to determine the amount of time that each service has been viewed. A method of displaying an ensemble, a service, and the amount of time that the service has been viewed will be described later.

Figure 4:
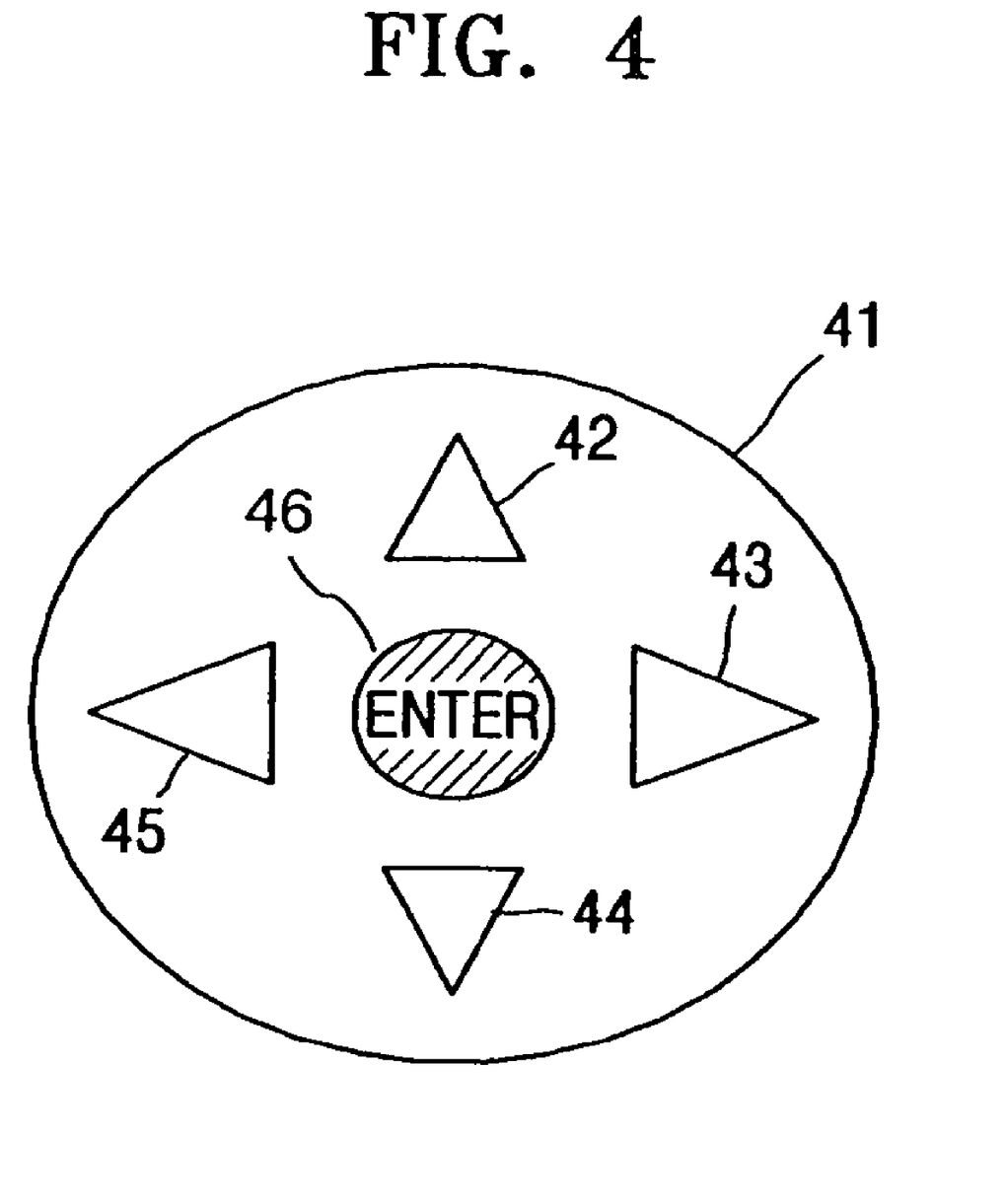
FIG. 4 is a view of a user interface input device through which a desired service is selected consistent with an embodiment of the present invention.

FIG. 4 is a view of an exemplary user interface input device 41, through which a desired service can be selected. Referring to FIG. 4, the user interface input device 41 includes four directional keys 42-45, and an enter key 46 that help a user easily navigate the services illustrated in FIG. 3. A user interface of a DMB receiver consistent with the present invention uses grid-type matrix access, not conventional sequential access, thereby reducing the number of key-presses required to select a service.

Figure 8:
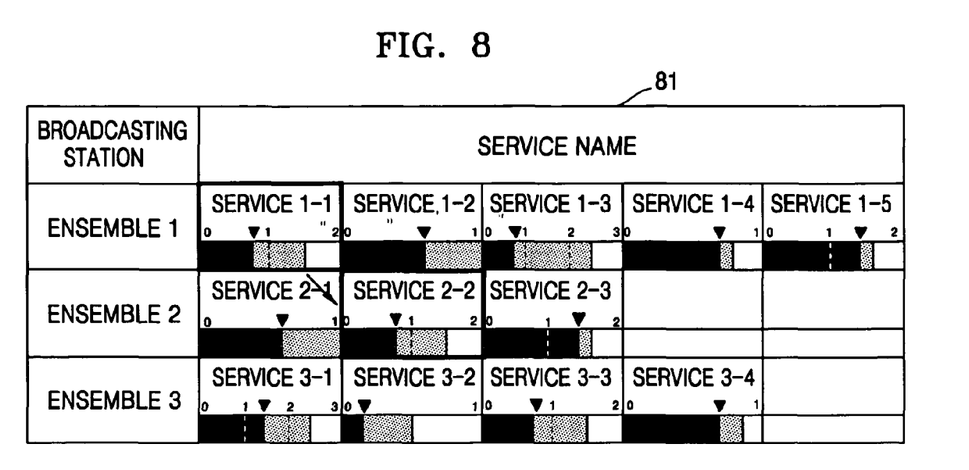
FIG. 8 is a diagram illustrating a method of changing services in a user interface screen consistent with an embodiment of the present invention.

FIG. 8 is a diagram illustrating a method of changing services in a user interface screen 81 consistent with an embodiment of the present invention. In detail, FIG. 8 illustrates a method of selecting a service 2-2 while viewing a service 1-1. When the user is viewing service 1-1, service 1-1 is highlighted in the user interface screen 81. If the user sequentially presses a down arrow key 44 and a right arrow key 43 of FIG. 4, a highlight is moved to service 2-2. When the user presses the enter key 46 of FIG. 4, service 2-2 is selected. Alternatively, service 2-2 may be highlighted and selected by sequentially pressing the right arrow key 43 and the down arrow key 44, without pressing an enter key 46. In contrast, in the case of a user interface using conventional sequential access, service 2-2 is selected by sequentially moving a highlight over services 1-1, 1-2, 1-3, . . . , 2-1, and 2-2. That is, use of a grid-type user interface screen and user interface input device according to the present invention reduces the number of key-presses required to navigate to a desired service.

Figure 7:
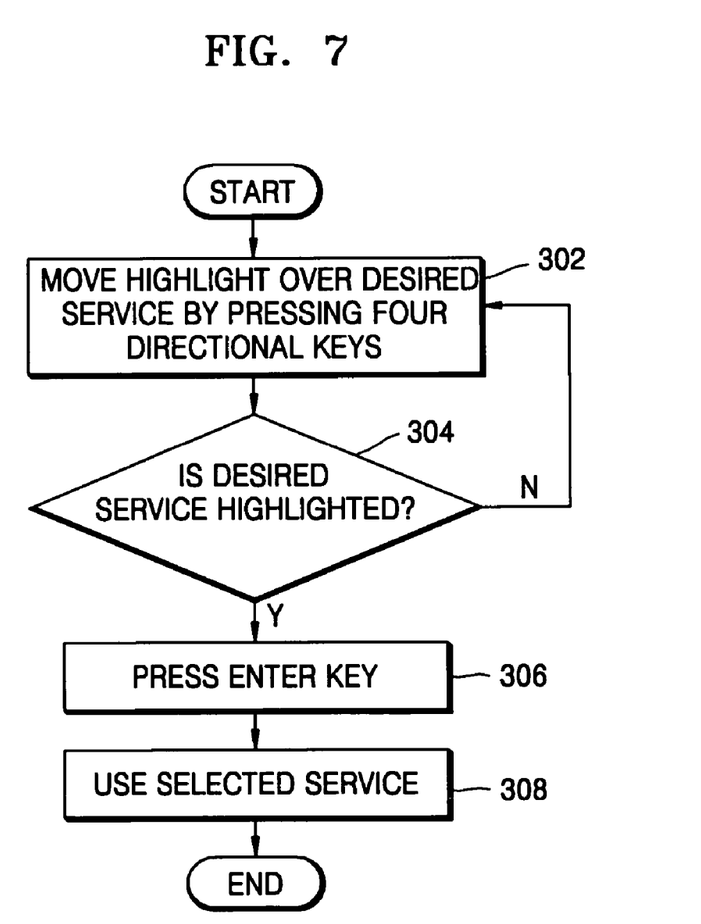
FIG. 7 is a flowchart illustrating a method of selecting a service consistent with an embodiment of the present invention.

FIG. 7 is a flowchart illustrating a method of changing services using a grid-type user interface screen and a user interface input device consistent with an embodiment of the present invention. Referring to FIG. 7, a highlight is moved over a desired service by pressing directional keys 42-45 of the user interface input device 41 (operation 302). When the desired service is highlighted (operation 304), an enter key 46 of the user interface input device 41 is pressed to select the highlighted service (operation 306). Next, the user can view the selected service (operation 308). Use of this user interface screen 31 and user interface input device 41 reduces the number of key-presses required to select a desired service.

Figure 5:
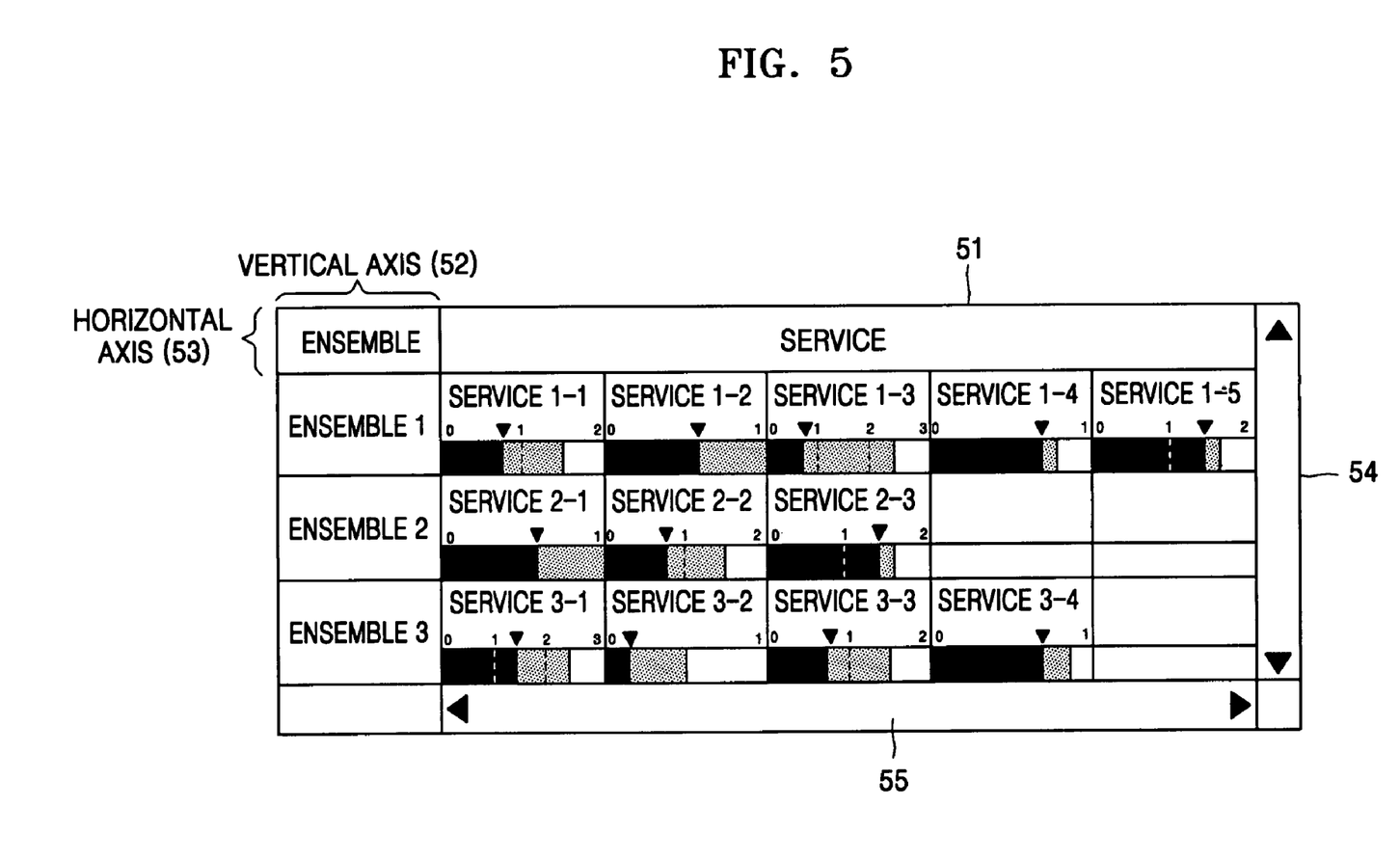
FIG. 5 is a view of a user interface screen in which a desired service is selected consistent with an embodiment of the present invention.

FIG. 5 is a view of a user interface screen 51 in which a desired service is selected consistent with an aspect of the present invention. Referring to FIG. 5, the user interface screen 51 includes a vertical axis 52 on which ensembles are displayed, horizontal axes 53 on which services are displayed, an ensemble scroll bar 54 opposite to the vertical axis, and a service scroll bar 55 at the bottom of the user interface screen 51. The aforementioned four-directional key input device 41 and the ensemble and service scroll bars 54, 55 make service menu navigation quicker and easier. The type of the input device is not limited. For instance, the input device may be a keypad input device built into a DMB receiver or a separate input device connected to the DMB receiver with or without wires. Also, the input device may be a touch display screen of the DMB receiver.

The constitution of an example DMB receiver and a user interface method thereof will now be described in greater detail.

Figure 9:
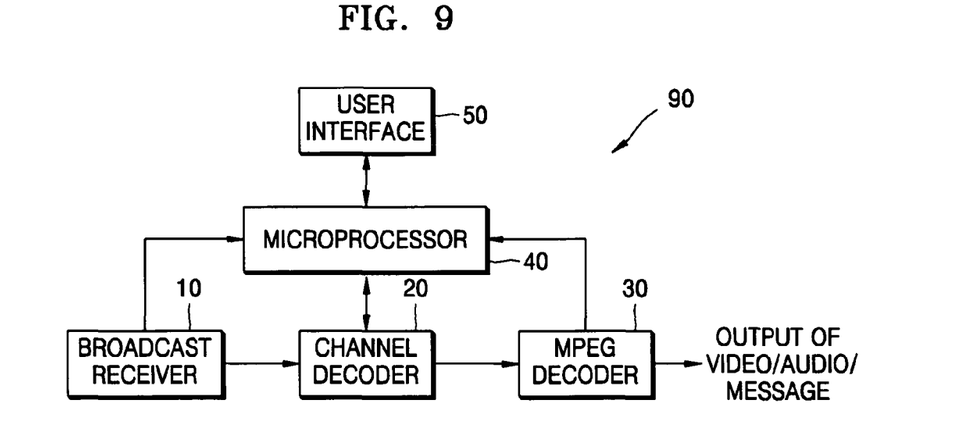
FIG. 9 is a block diagram of a DMB receiver consistent with an embodiment of the present invention.

FIG. 9 is a block diagram of a DMB receiver 90 consistent with one embodiment of the present invention. Referring to FIG. 9, the DMB receiver 90 includes a broadcast receiver 10, a channel decoder 20, an MPEG decoder 30, a microprocessor 40, and a user interface 50.

The broadcast receiver 10 can receive a DMB signal via various types of broadcasting such as satellite broadcasting and terrestrial broadcasting. The channel decoder 20 divides the received DMB signal into sub signals, processes the sub signals, and sends data of a service selected by a user to the MPEG decoder 30. The MPEG decoder 30 decodes the data processed by the channel decoder 20 according to an MPEG standard, and outputs video information, audio information, and/or a message.

The microprocessor 40 can display a grid-type user interface screen such as that shown in FIG. 3 through the user interface 50. Microprocessor 40 can receive information regarding a service selected by a user using an input device such as device 41 illustrated in FIG. 4, and send the information regarding the selected service to the channel decoder 20. As described above, the user interface 50 can include a display unit for displaying a grid-type user interface screen and an input unit through which the user inputs the information regarding the selected service. If the user interface 50 is a touch screen, an input unit and a display unit may be combined.

Figure 10:
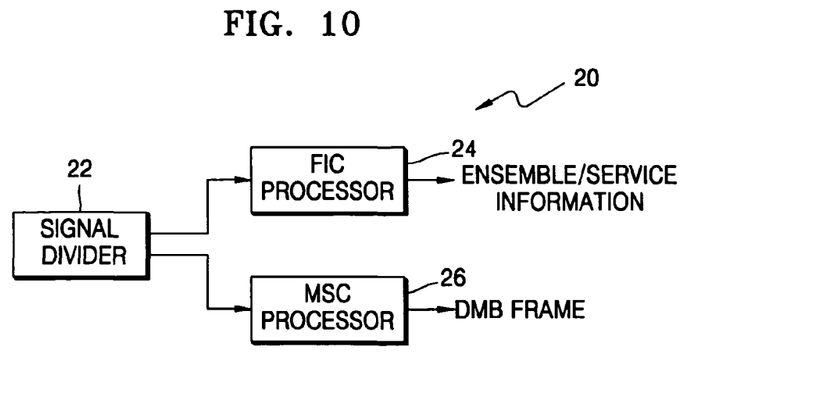
FIG. 10 is a block diagram of a channel decoder of the DMB receiver of FIG. 9 consistent with an embodiment of the present invention.

FIG. 10 is a detailed block diagram of the channel decoder 20 of FIG. 9. Referring to FIG. 10, the channel decoder 20 includes a signal divider 22, a Fast Information Channel (FIC) processor 24, and a Main Service Channel (MSC) processor 26. The signal divider 22 divides the received DMB signal to obtain FIC data and MSC data from a data frame of the DMB signal which will be described later. The obtained FIC data and MSC data are processed by the FIC processor 24 and the MSC processor 26, respectively.

Figure 11:
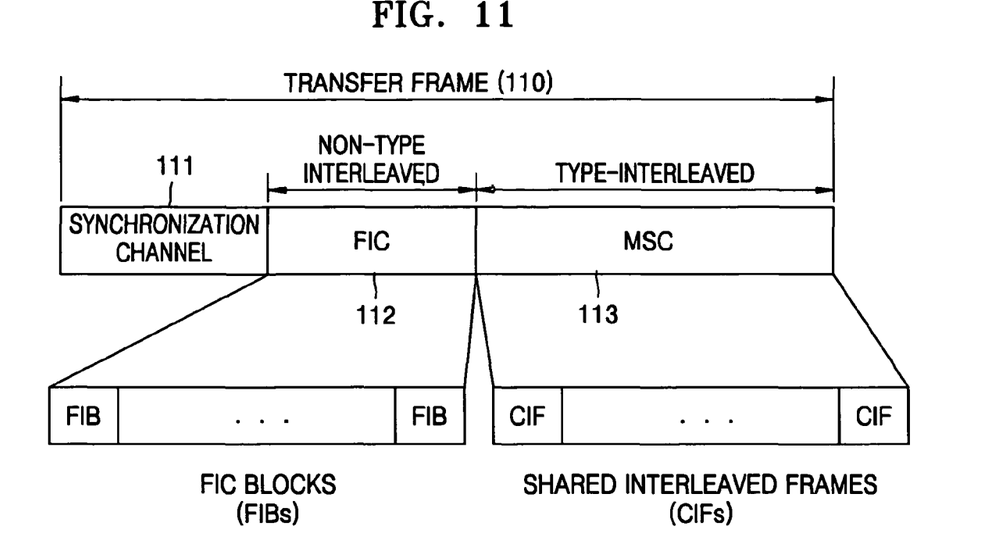
FIG. 11 illustrates the structure of a DMB transfer frame consistent with an embodiment of the present invention.

FIG. 11 illustrates a representative structure of a transfer frame 110 of a DMB signal consistent with an embodiment of the present invention. Referring to FIG. 11, the transfer frame 110 includes a synchronization channel 111, an FIC 112, and an MSC 113. The synchronization channel 111 is information for synchronizing a transfer frame 110, the FIC 112 is information which must be analyzed before analyzing main service information, and the MSC 113 is information regarding a DMB.

Figure 12:
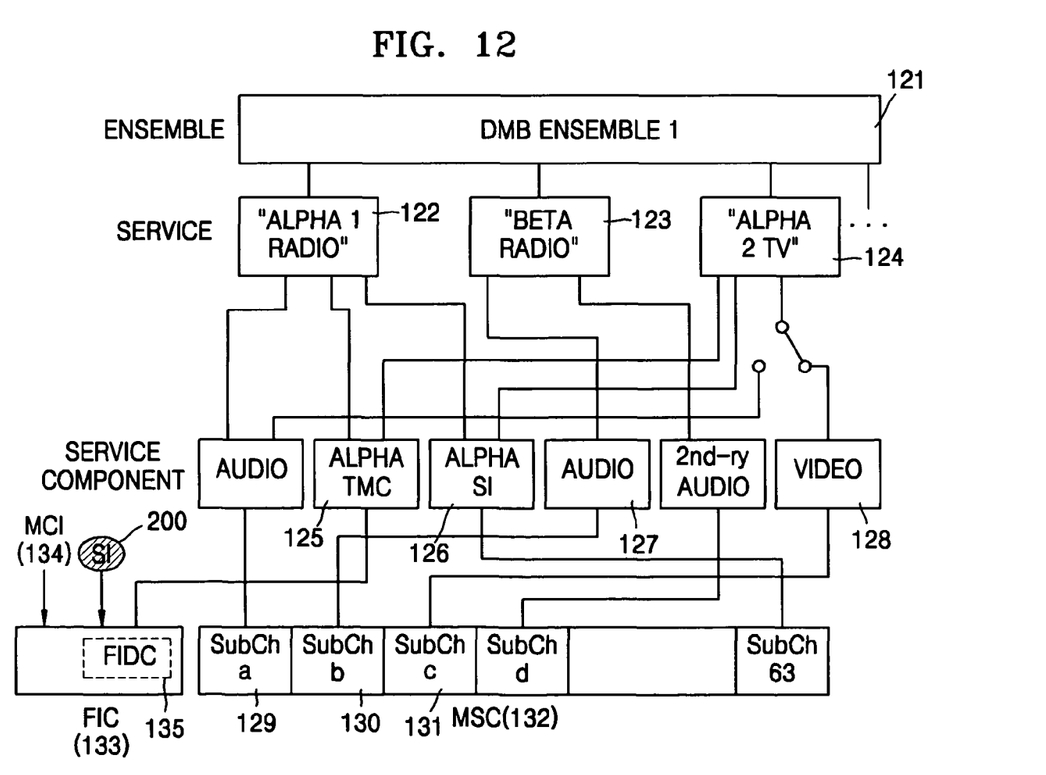
FIG. 12 illustrates the construction of DMB services consistent with an embodiment of the present invention.

FIG. 12 illustrates the construction of DMB services consistent with an embodiment of the present invention. Referring to FIG. 12, a DMB ensemble 1 (121) contains services such as "alpha 1 radio" 122, "beta radio" 123, and "alpha 2 TV" 124. The "alpha 2 TV" service 124 contains service components such as alpha TMC 125, alpha SI 126, audio 127, and video 128. The service components correspond to sub-channels a, b, c, . . . (129, 130, 131 . . . ). A main service channel MSC 132 contains data of each of the sub channels a, b, c, . . . .

Referring to FIG. 12, an FIC 133 contains Main Channel Information (MCI) 134, Service Information (SI) 200, and a Fast Information Data Channel (FIDC) 135 that is information to be transmitted at high speed. In particular, the SI 200 includes information of ensembles and services, and provides the above-described user interface.

Figure 13:
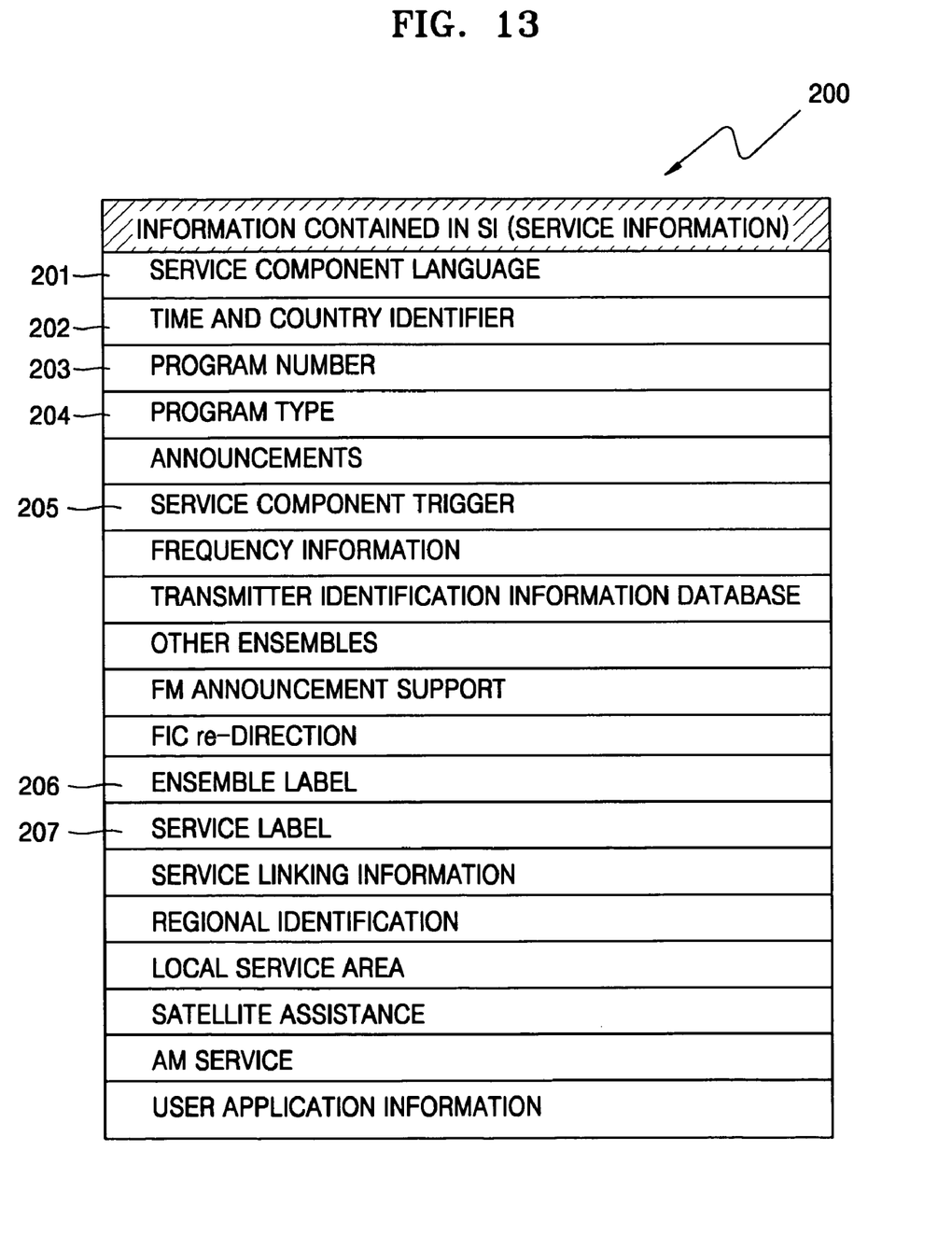
FIG. 13 illustrates the construction of service information (SI) contained in a fast information channel (FIC) shown in FIG. 12 consistent with an embodiment of the present invention.

FIG. 13 illustrates the construction of the SI 200 of FIG. 12. Referring to FIG. 13, the SI 200 includes information such as service component languages 201, time and country identifiers 202, program numbers 203, and program types 204. In particular, the SI 200 contains an ensemble label 206, a service label 207, and a service component trigger 205. The ensemble label 206 is information that displays the ensemble axis 32 of FIG. 3. The service label 207 is information that displays services linked to each ensemble.

Information regarding the duration (e.g., start/ending time) of each service, which is required to display the status of each service shown in FIG. 3 using a status bar, may be obtained through a data service that a broadcasting station provides separately. The duration of a service may be obtained from Program Association Data (PAD) or an Electronic Program Guide (EPG) which is an additional service channel. The service component trigger 205 indicates the time when a service begins to be broadcast, that is, when service channels are changed. Accordingly, it is possible to display the duration for which the service has been viewed using the service component trigger 205.

Figure 14:
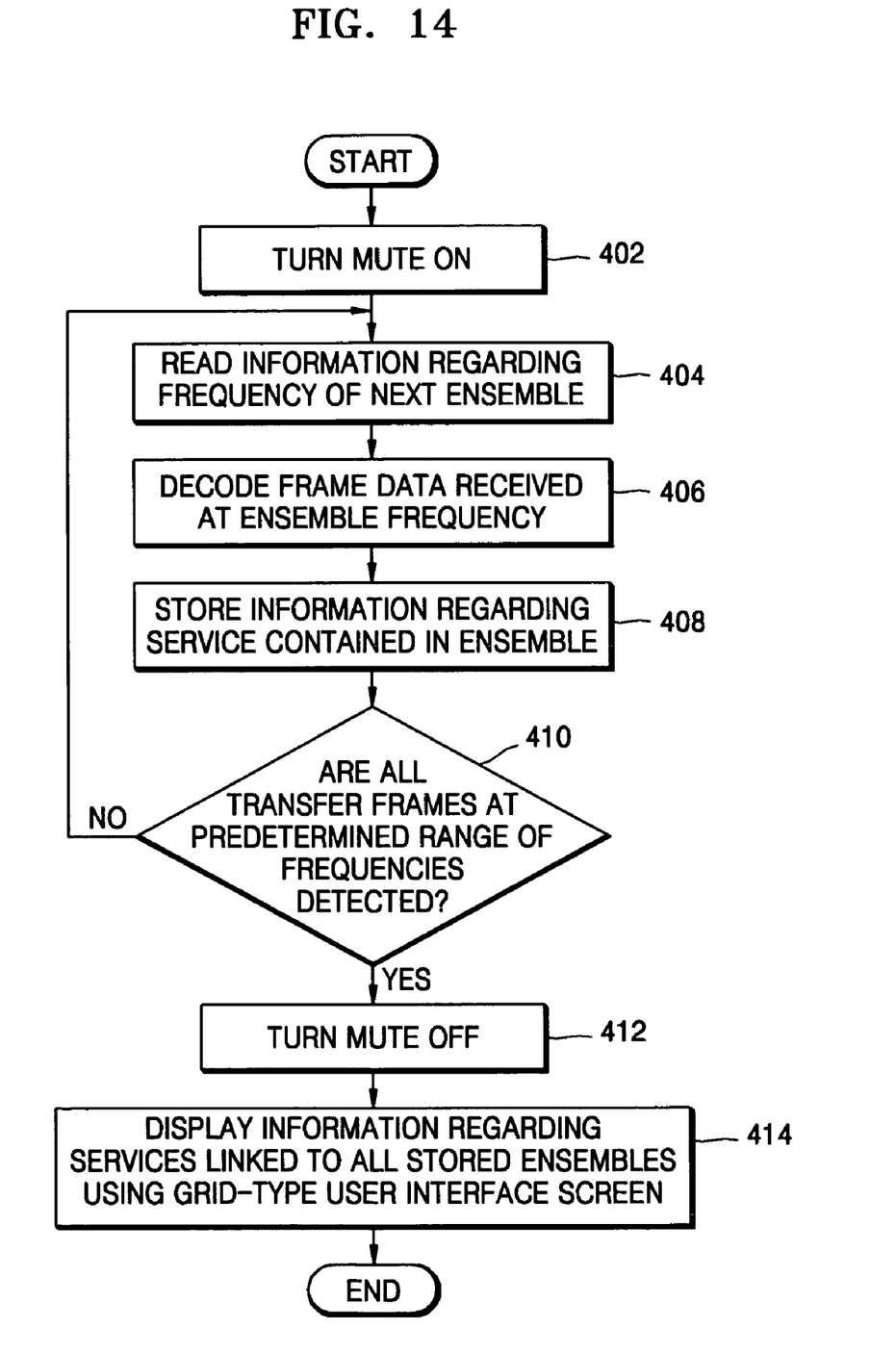
FIG. 14 is a flowchart illustrating a method of displaying SI consistent with an embodiment of the present invention.

FIG. 14 is a flowchart illustrating a method of displaying information regarding a service consistent with an embodiment of the present invention. Referring to FIG. 14, a mute function is turned on by transmitting a mute signal to the MPEG decoder 30 of FIG. 9, thereby preventing noise from being detected (operation 402). Next, ensemble frequency data is read from the microprocessor 40 to detect the frequency of a next ensemble (operation 404). Next, a transfer frame received at the detected frequency is decoded by the channel decoder 20 (operation 406). Next, information regarding a service linked to the next ensemble is stored using SI contained in an FIC of the transfer frame (operation 408). Next, it is determined whether all transfer frames within a predetermined range of frequencies (frequency band) are detected (operation 410). When all the transfer frames are detected, a mute off signal is transmitted to the MPEG decoder 30 (operation 412). Thereafter, information regarding services linked to all stored ensembles is displayed using the above described grid-type user interface screen that includes the ensemble axis and the service axis (operation 414).

In this disclosure, an example of the user interface screen 31 according to the present invention is shown in FIG. 3 to include a vertical ensemble axis and a horizontal service axis, but the present invention is not limited to this embodiment.

As described above, a DMB receiver and a user interface method thereof consistent with the present invention enable a plurality of services to be linked to an ensemble and a desired service to be easily selected.

Specifically, it is possible to display a plurality of services linked to an ensemble using a grid-type user interface screen with an ensemble axis and a service axis and thereby visualize novel DMB contents. Further, the characteristic of DMB that enables services linked to an ensemble to be changed at a transmitter's discretion can be reflected in a user interface consistent with the present invention.

In addition, a user can easily determine the current status of a service by graphically displaying the total duration of a service and the duration for which the service has been viewed up to present.

Methods of displaying, changing, and selecting services consistent with the present invention may be embodied as a computer program. Code and code segments of the computer program may be easily derived by computer programmers skilled in the art to which the present invention pertains. The computer program may be stored in a computer-readable medium executed using a computer. Examples of such a computer-readable medium include a magnetic recording medium, an optical recording medium, or even carrier waves (such as in transmission over the Internet).

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A digital multimedia broadcast (DMB) receiver comprising:
    a receiver receiving a DMB signal;
    a processor processing the received DMB signal and extracting information regarding ensembles and services from the DMB signal; and
    a user interface displaying received services using the extracted information regarding the ensembles and services, the user interface being a grid-type interface which includes an ensemble axis and a service axis.

2. The DMB receiver of claim 1, wherein the user interface further comprises an input unit receiving information regarding a desired service from a user.

3. The DMB receiver of claim 2, wherein the input unit comprises four directional keys and an enter key, and the desired service is selected by manipulating the four directional keys and the enter key.

4. The DMB receiver of claim 2, wherein the services are displayed in a grid on the user interface, the user interface receives the information regarding the desired service from the user via the input unit, and the processor executes the desired service.

5. The DMB receiver of claim 1, wherein the user interface further displays a total duration of each service and a duration that each service has been viewed.

6. The DMB receiver of claim 5, wherein the user interface displays the total duration of each service and the duration that each service has been viewed using status bars.

7. The DMB receiver of claim 1, wherein the processor extracts the information regarding the ensembles and the services from service information contained in a fast information channel of the DMB signal.

8. The DMB receiver of claim 1, wherein the receiver receives the DMB signal via a satellite broadcast, a surface broadcast, or a broadcasting method which is a combination of satellite and surface broadcasting.

9. The DMB receiver of claim 1, wherein the DMB receiver is one of a setup box, a recorder, a reproducer, a digital television receiver, and a mobile device.

10. The DMB receiver of claim 1, wherein the ensembles comprise a plurality of services.

11. The DMB receiver of claim 1, wherein a desired broadcast is selected form a plurality of broadcasts requires a selection of an ensemble together with a service.

12. The DMB receiver of claim 1, wherein the services comprise a plurality of services broadcasted in the same time zone.

13. A user interface method for a digital multimedia broadcast (DMB) receiver, comprising:
    extracting information regarding ensembles and services contained in an input DMB signal by processing the input DMB signal; and
    displaying received services on the user interface using the extracted information,
    wherein the user interface is a grid-type interface which includes an ensemble axis and a service axis.

14. The user interface method of claim 13, after displaying the received services, further comprising:
    receiving information regarding a desired service from a user.

15. The user interface method of claim 14, wherein the information regarding the desired service is received by user manipulation of four directional keys and an enter key which are installed in an input unit.

16. The user interface method of claim 14, after receiving the information regarding the selected service, further comprising:
    executing the selected service.

17. The user interface method of claim 13, wherein a total duration of each service and a duration that each service has been viewed are displayed along with the received services.

18. The user interface method of claim 17, wherein the total duration of each service and the duration that each service has been viewed are displayed using status bars.

19. The user interface method of claim 13, wherein the information regarding ensembles and services is extracted from service information contained in a fast information channel of the DMB signal.

20. The user interface method of claim 13, wherein the ensembles comprise a plurality of services.

21. The user interface method of claim 13, wherein a desired broadcast is selected form a plurality of broadcasts requires a selection of an ensemble together with a service.

22. The user interface method of claim 13, wherein the services comprise a plurality of services broadcasted in the same time zone.

* * * * *